US008484220B2

(12) United States Patent
Stewart et al.

(10) Patent No.: US 8,484,220 B2
(45) Date of Patent: Jul. 9, 2013

(54) CLUSTERED INDEX WITH DIFFERENTIATED SUBFIELDS

(75) Inventors: Howard D. Stewart, Idaho Falls, ID (US); Kenneth Russell, Idaho Falls, ID (US); Paul H. Whittington, Idaho Falls, ID (US)

(73) Assignee: McAfee, Inc., Santa Clara, CA (US)

( * ) Notice: Subject to any disclaimer, the term of this patent is extended or adjusted under 35 U.S.C. 154(b) by 1308 days.

(21) Appl. No.: 11/715,262

(22) Filed: Mar. 6, 2007

(65) Prior Publication Data

US 2008/0222104 A1 Sep. 11, 2008

(51) Int. Cl.
*G06F 17/30* (2006.01)

(52) U.S. Cl.
CPC ............... *G06F 17/30598* (2013.01)
USPC .......................... 707/741; 707/769

(58) Field of Classification Search
CPC .............................. G06F 17/30598
USPC ................... 707/741, 743, 769, 770
See application file for complete search history.

(56) References Cited

U.S. PATENT DOCUMENTS

| | | | |
|---|---|---|---|
| 5,822,749 A | 10/1998 | Agarwal et al. | |
| 6,175,835 B1 | 1/2001 | Shadmon | |
| 6,278,992 B1 | 8/2001 | Curtis et al. | |
| 6,356,890 B1 | 3/2002 | Agrawal et al. | |
| 6,360,215 B1 | 3/2002 | Judd et al. | |
| 6,366,903 B1 | 4/2002 | Agrawal et al. | |
| 6,480,839 B1 | 11/2002 | Whittington et al. | |
| 6,826,123 B1 * | 11/2004 | Herring | 368/46 |
| 2003/0195898 A1 | 10/2003 | Agarwal et al. | |
| 2004/0002958 A1 * | 1/2004 | Seshadri et al. | 707/669 |
| 2004/0205110 A1 * | 10/2004 | Hinshaw | 709/201 |
| 2005/0080869 A1 * | 4/2005 | Bender et al. | 709/212 |
| 2005/0091383 A1 * | 4/2005 | Bender et al. | 709/228 |
| 2005/0177633 A1 * | 8/2005 | Plunkett | 709/225 |
| 2007/0083491 A1 * | 4/2007 | Walmsley et al. | 707/669 |
| 2008/0059412 A1 * | 3/2008 | Tarin | 707/2 |
| 2008/0133517 A1 * | 6/2008 | Kapoor et al. | 707/749 |
| 2008/0177756 A1 * | 7/2008 | Kosche et al. | 707/100 |
| 2010/0191719 A1 * | 7/2010 | Weissman et al. | 707/716 |
| 2010/0223629 A1 * | 9/2010 | Appelbaum et al. | 719/318 |

OTHER PUBLICATIONS

"AdaSAGE Application Development Environment," http://www.adaic.com/docs/flyers/adasage.shtml.
"The AdaSAGE Application Development Environment," http://adaic.org/AdaIC/docs/flyers/text/adasage.txt.
"Conference Announcements: Ada The Language for a Complex World, Call for Participation—European AdaSAGE Tutorials," http://www.cs.kuleuven.ac.be/~dirk/adabelgium/events/95/950530-sage.html.
Baragoin, Corinne et al., "Up and Running with DB2 UDB Ese: Partitioning for Performance in an e-Business Intelligence World," IBM Redbooks, Chapter 4, Feb. 2003.
Garcia-Molina, et al., "Defining a Relation Schema in SQL," Database Systems: The Complete Book International Edition, Pearson-Prentice Hall, 2002, pp. 295-300, 610-612, 687-690, 757-759, 860-862.
Partial International Search Report for International Application No. PCT/US2008/056095, Jul. 31, 2008, 3 pages.

* cited by examiner

*Primary Examiner* — Shahid Alam
(74) *Attorney, Agent, or Firm* — Wong, Cabello, Lutsch, Rutherford & Brucculeri, L.L.P.

(57) ABSTRACT

A database system uses indexes to improve performance. The system can use one or more of the following: differentiated subfields for index clustering; set function calculations to reduce the amount of I/O; and/or using an inferred index in a circular table.

18 Claims, 8 Drawing Sheets

| Timestamp | Major Segment (day) | Minor Segment (hour:minute:second) |
|---|---|---|
| 12/1/2006 11:9:32 | 12/1/2006 | 11:9:32 |
| 12/1/2006 15:13:15 | 12/1/2006 | 15:13:15 |
| 12/5/2006 17:7:12 | 12/5/2006 | 17:7:12 |
| 12/5/2006 23:45:56 | 12/5/2006 | 23:45:56 |
| 1/4/2007 7:34:41 | 1/4/2007 | 7:34:41 |
| 2/7/2007 12:38:50 | 2/7/2007 | 12:38:50 |
| 2/8/2007 15:43:45 | 2/8/2007 | 15:43:45 |

Fig. 4

| Insertion Order | Dtime | PartNo |
|---|---|---|
| 1 | 1/2/2006 2:45:46 | 6 |
| 2 | 1/2/2006 3:49:9 | 1 |
| 3 | 1/2/2006 5:45:31 | 4 |
| 4 | 1/2/2006 10:8:43 | 7 |
| 5 | 1/2/2006 15:36:29 | 1 |
| 6 | 1/2/2006 20:13:2 | 3 |
| 7 | 1/2/2006 21:20:53 | 2 |
| 8 | 1/3/2006 0:48:22 | 5 |
| 9 | 1/3/2006 3:35:57 | 2 |
| 10 | 1/3/2006 3:46:55 | 3 |
| 11 | 1/3/2006 6:10:47 | 4 |
| 12 | 1/3/2006 12:33:22 | 2 |
| 13 | 1/3/2006 19:3:49 | 1 |
| 14 | 1/3/2006 23:32:50 | 5 |
| 15 | 1/4/2006 6:24:10 | 7 |
| 16 | 1/4/2006 8:48:33 | 1 |
| 17 | 1/4/2006 13:59:52 | 5 |
| 18 | 1/4/2006 16:49:20 | 2 |
| 19 | 1/4/2006 23:53:44 | 7 |
| 20 | 1/5/2006 1:52:13 | 2 |
| 21 | 1/5/2006 8:11:41 | 2 |
| 22 | 1/5/2006 13:38:2 | 5 |
| 23 | 1/5/2006 18:19:7 | 6 |
| 24 | 1/5/2006 18:53:27 | 6 |
| 25 | 1/5/2006 23:59:58 | 3 |
| 26 | 1/6/2006 4:50:27 | 4 |
| 27 | 1/6/2006 11:55:27 | 2 |
| 28 | 1/6/2006 12:52:57 | 4 |
| 29 | 1/6/2006 15:7:7 | 6 |
| 30 | 1/6/2006 16:37:0 | 3 |
| 31 | 1/6/2006 20:58:34 | 7 |
| 32 | 1/7/2006 2:19:19 | 2 |
| 33 | 1/7/2006 4:28:30 | 7 |
| 34 | 1/7/2006 4:39:16 | 1 |
| 35 | 1/7/2006 10:28:13 | 3 |
| 36 | 1/7/2006 11:38:32 | 6 |
| 37 | 1/7/2006 17:31:46 | 3 |
| 38 | 1/7/2006 22:25:4 | 2 |
| 39 | 1/8/2006 4:55:57 | 7 |
| 40 | 1/8/2006 8:50:14 | 1 |
| 41 | 1/8/2006 10:48:17 | 3 |
| 42 | 1/8/2006 11:19:38 | 2 |
| 43 | 1/8/2006 17:58:42 | 1 |
| 44 | 1/8/2006 20:59:13 | 6 |
| 45 | 1/8/2006 22:6:28 | 5 |
| 46 | 1/9/2006 5:11:32 | 6 |
| 47 | 1/9/2006 7:54:27 | 7 |
| 48 | 1/9/2006 8:52:18 | 2 |
| 49 | 1/9/2006 15:42:54 | 6 |
| 50 | 1/9/2006 18:4:22 | 2 |
| 51 | 1/9/2006 22:15:57 | 4 |

Fig. 5

| Insertion Order | Index 1 part + Dtime |
|---|---|
| 2 | 1 + 1/2/2006 3:49:9 |
| 5 | 1 + 1/2/2006 15:36:29 |
| 13 | 1 + 1/3/2006 19:3:49 |
| 16 | 1 + 1/4/2006 8:48:33 |
| 34 | 1 + 1/7/2006 4:39:16 |
| 40 | 1 + 1/8/2006 8:50:14 |
| 43 | 1 + 1/8/2006 17:58:42 |
| 7 | 2 + 1/2/2006 21:20:53 |
| 9 | 2 + 1/3/2006 3:35:57 |
| 12 | 2 + 1/3/2006 12:33:22 |
| 18 | 2 + 1/4/2006 16:49:20 |
| 20 | 2 + 1/5/2006 1:52:13 |
| 21 | 2 + 1/5/2006 8:11:41 |
| 27 | 2 + 1/6/2006 11:55:27 |
| 32 | 2 + 1/7/2006 2:19:19 |
| 38 | 2 + 1/7/2006 22:25:4 |
| 42 | 2 + 1/8/2006 11:19:38 |
| 48 | 2 + 1/9/2006 8:52:18 |
| 50 | 2 + 1/9/2006 18:4:22 |
| 6 | 3 + 1/2/2006 20:13:2 |
| 10 | 3 + 1/3/2006 3:46:55 |
| 25 | 3 + 1/5/2006 23:59:58 |
| 30 | 3 + 1/6/2006 16:37:0 |
| 35 | 3 + 1/7/2006 10:28:13 |
| 37 | 3 + 1/7/2006 17:31:46 |
| 41 | 3 + 1/8/2006 10:48:17 |
| 3 | 4 + 1/2/2006 5:45:31 |
| 11 | 4 + 1/3/2006 6:10:47 |
| 26 | 4 + 1/6/2006 4:50:27 |
| 28 | 4 + 1/6/2006 12:52:57 |
| 51 | 4 + 1/9/2006 22:15:57 |
| 8 | 5 + 1/3/2006 0:48:22 |
| 14 | 5 + 1/3/2006 23:32:50 |
| 17 | 5 + 1/4/2006 13:59:52 |
| 22 | 5 + 1/5/2006 13:38:2 |
| 45 | 5 + 1/8/2006 22:6:28 |
| 1 | 6 + 1/2/2006 2:45:46 |
| 23 | 6 + 1/5/2006 18:19:7 |
| 24 | 6 + 1/5/2006 18:53:27 |
| 29 | 6 + 1/6/2006 15:7:7 |
| 36 | 6 + 1/7/2006 11:38:32 |
| 44 | 6 + 1/8/2006 20:59:13 |
| 46 | 6 + 1/9/2006 5:11:32 |
| 49 | 6 + 1/9/2006 15:42:54 |
| 4 | 7 + 1/2/2006 10:8:43 |
| 15 | 7 + 1/4/2006 6:24:10 |
| 19 | 7 + 1/4/2006 23:53:44 |
| 31 | 7 + 1/6/2006 20:58:34 |
| 33 | 7 + 1/7/2006 4:28:30 |
| 39 | 7 + 1/8/2006 4:55:57 |
| 47 | 7 + 1/9/2006 7:54:27 |

Fig. 6

| Insertion Order | Index 2<br>Dtime + part |
|---|---|
| 1 | 1/2/2006 2:45:46 + 6 |
| 2 | 1/2/2006 3:49:9 + 1 |
| 3 | 1/2/2006 5:45:31 + 4 |
| 4 | 1/2/2006 10:8:43 + 7 |
| 5 | 1/2/2006 15:36:29 + 1 |
| 6 | 1/2/2006 20:13:2 + 3 |
| 7 | 1/2/2006 21:20:53 + 2 |
| 8 | 1/3/2006 0:48:22 + 5 |
| 9 | 1/3/2006 3:35:57 + 2 |
| 10 | 1/3/2006 3:46:55 + 3 |
| 11 | 1/3/2006 6:10:47 + 4 |
| 12 | 1/3/2006 12:33:22 + 2 |
| 13 | 1/3/2006 19:3:49 + 1 |
| 14 | 1/3/2006 23:32:50 + 5 |
| 15 | 1/4/2006 6:24:10 + 7 |
| 16 | 1/4/2006 8:48:33 + 1 |
| 17 | 1/4/2006 13:59:52 + 5 |
| 18 | 1/4/2006 16:49:20 + 2 |
| 19 | 1/4/2006 23:53:44 + 7 |
| 20 | 1/5/2006 1:52:13 + 2 |
| 21 | 1/5/2006 8:11:41 + 2 |
| 22 | 1/5/2006 13:38:2 + 5 |
| 23 | 1/5/2006 18:19:7 + 6 |
| 24 | 1/5/2006 18:53:27 + 6 |
| 25 | 1/5/2006 23:59:58 + 3 |
| 26 | 1/6/2006 4:50:27 + 4 |
| 27 | 1/6/2006 11:55:27 + 2 |
| 28 | 1/6/2006 12:52:57 + 4 |
| 29 | 1/6/2006 15:7:7 + 6 |
| 30 | 1/6/2006 16:37:0 + 3 |
| 31 | 1/6/2006 20:58:34 + 7 |
| 32 | 1/7/2006 2:19:19 + 2 |
| 33 | 1/7/2006 4:28:30 + 7 |
| 34 | 1/7/2006 4:39:16 + 1 |
| 35 | 1/7/2006 10:28:13 + 3 |
| 36 | 1/7/2006 11:38:32 + 6 |
| 37 | 1/7/2006 17:31:46 + 3 |
| 38 | 1/7/2006 22:25:4 + 2 |
| 39 | 1/8/2006 4:55:57 + 7 |
| 40 | 1/8/2006 8:50:14 + 1 |
| 41 | 1/8/2006 10:48:17 + 3 |
| 42 | 1/8/2006 11:19:38 + 2 |
| 43 | 1/8/2006 17:58:42 + 1 |
| 44 | 1/8/2006 20:59:13 + 6 |
| 45 | 1/8/2006 22:6:28 + 5 |
| 46 | 1/9/2006 5:11:32 + 6 |
| 47 | 1/9/2006 7:54:27 + 7 |
| 48 | 1/9/2006 8:52:18 + 2 |
| 49 | 1/9/2006 15:42:54 + 6 |
| 50 | 1/9/2006 18:4:22 + 2 |
| 51 | 1/9/2006 22:15:57 + 4 |

Fig. 7

| Insertion Order | Index 3<br>Dtime1 + part + Dtime2 |
|---|---|
| 2 | 1/2/2006 + 1 + 3:49:9 |
| 5 | 1/2/2006 + 1 + 15:36:29 |
| 7 | 1/2/2006 + 2 + 21:20:53 |
| 6 | 1/2/2006 + 3 + 20:13:2 |
| 3 | 1/2/2006 + 4 + 5:45:31 |
| 1 | 1/2/2006 + 6 + 2:45:46 |
| 4 | 1/2/2006 + 7 + 10:8:43 |
| 13 | 1/3/2006 + 1 + 19:3:49 |
| 9 | 1/3/2006 + 2 + 3:35:57 |
| 12 | 1/3/2006 + 2 + 12:33:22 |
| 10 | 1/3/2006 + 3 + 3:46:55 |
| 11 | 1/3/2006 + 4 + 6:10:47 |
| 8 | 1/3/2006 + 5 + 0:48:22 |
| 14 | 1/3/2006 + 5 + 23:32:50 |
| 16 | 1/4/2006 + 1 + 8:48:33 |
| 18 | 1/4/2006 + 2 + 16:49:20 |
| 17 | 1/4/2006 + 5 + 13:59:52 |
| 15 | 1/4/2006 + 7 + 6:24:10 |
| 19 | 1/4/2006 + 7 + 23:53:44 |
| 20 | 1/5/2006 + 2 + 1:52:13 |
| 21 | 1/5/2006 + 2 + 8:11:41 |
| 25 | 1/5/2006 + 3 + 23:59:58 |
| 22 | 1/5/2006 + 5 + 13:38:2 |
| 23 | 1/5/2006 + 6 + 18:19:7 |
| 24 | 1/5/2006 + 6 + 18:53:27 |
| 27 | 1/6/2006 + 2 + 11:55:27 |
| 30 | 1/6/2006 + 3 + 16:37:0 |
| 26 | 1/6/2006 + 4 + 4:50:27 |
| 28 | 1/6/2006 + 4 + 12:52:57 |
| 29 | 1/6/2006 + 6 + 15:7:7 |
| 31 | 1/6/2006 + 7 + 20:58:34 |
| 34 | 1/7/2006 + 1 + 4:39:16 |
| 32 | 1/7/2006 + 2 + 2:19:19 |
| 38 | 1/7/2006 + 2 + 22:25:4 |
| 35 | 1/7/2006 + 3 + 10:28:13 |
| 37 | 1/7/2006 + 3 + 17:31:46 |
| 36 | 1/7/2006 + 6 + 11:38:32 |
| 33 | 1/7/2006 + 7 + 4:28:30 |
| 40 | 1/8/2006 + 1 + 8:50:14 |
| 43 | 1/8/2006 + 1 + 17:58:42 |
| 42 | 1/8/2006 + 2 + 11:19:38 |
| 41 | 1/8/2006 + 3 + 10:48:17 |
| 45 | 1/8/2006 + 5 + 22:6:28 |
| 44 | 1/8/2006 + 6 + 20:59:13 |
| 39 | 1/8/2006 + 7 + 4:55:57 |
| 48 | 1/9/2006 + 2 + 8:52:18 |
| 50 | 1/9/2006 + 2 + 18:4:22 |
| 51 | 1/9/2006 + 4 + 22:15:57 |
| 46 | 1/9/2006 + 6 + 5:11:32 |
| 49 | 1/9/2006 + 6 + 15:42:54 |
| 47 | 1/9/2006 + 7 + 7:54:27 |

Fig. 8

CLUSTERED INDEX WITH DIFFERENTIATED SUBFIELDS

TECHNICAL FIELD

This disclosure relates generally to data access and data manipulation systems and methods, and particularly to those that utilize enhanced indexing methods.

BACKGROUND

Web server applications are increasingly being used to provide users with access to data stored in databases over the Internet using web browsers. These web server applications respond to incoming user requests by providing concurrent threads of execution, each of which responds to an individual request, while maintaining per-user web server application access information. These requests often require different types of searches, calculations or modifications of data stored in large databases.

As a result of this environment, database oriented web server applications are required to logically maintain numbers of large result sets, and to be able to perform multiple types of calculations or insertions with high efficiency to maintain a reasonable performance level for the users.

Database designs have addressed the demand for increasing the performance of database operations, specifically searches and queries, by introducing indexes (also called inverted indexes). Each index is defined and exists within the context of a table in the database. Most indexes are optional, and are created by the user to enhance the speed of one or more queries performed on the table. The user can define more than one index for the same table, basing the indexes on different fields defined in the table. When the user defines an index based on a field in the table, the user is requesting the database to create a separate sorted list of all values of that field in that table, with a link from each value to the location of the corresponding record in the table. Thus, the database concept of an index is similar to the concept of indexes used, for example, in books.

As an example, consider a table of records arranged in rows and consisting of the names of all people in a company, with the first and last names saved in different fields (columns). As new names are added to the table, they can be added to the end of the stack on the disk in no specific order in relation to the value of the first or last name in the record. If the user knows that there will be frequent queries on the basis of the last names, the user can define an index for the last names in the table. As a result, the database creates a separate sorted list of all last names in the database, and includes within each record in the list a pointer to the location of the corresponding record in the table. In this way, whenever responding to a query for a specific last name (e.g. "Smith"), instead of walking through each record and performing a comparison of the value of the last name in that record with the desired last name (a method called full table scan), the database engine can search through the sorted index of last names and locate the records with the desired last name with fewer steps and then use their pointers to find the corresponding record(s) in the table. This is similar to the way one can locate all occurrences of a word in a book in much less time by using the book index instead of browsing through the whole book.

The index defined over the last names field, is an example of a simple index, defined over a single field of a table. A user may define multiple simple indexes for the same table to improve queries on those fields. On the other hand, one can also define a composite (multi-field) index, which is defined based on a combination of two or more fields in a table. For example, for the above table, assume that the database is frequently queried for records with specific conditions on last names and first names, e.g. all records with a specific last name ("Smith") where the first name starts with a specific letter (say "P"). With this information the user can define a multi-field index for this table, based on the values of the first name appended at the end of the value of the last name for each record. This index makes such a query easier.

Indexes are usually sorted in specific balanced tree structures of linked records to facilitate the search mechanism. While creating a new index for a table adds the benefit of efficiency and higher performance for specific queries that the index is designed for, it can also introduce costs. One cost is due to extra space needed to store the index tree. This storage space has to be allocated in addition to the space needed to store the records of the table and corresponding metadata. Another cost is incurred in performance. When a record (row) is inserted into or deleted from a table, a corresponding record must be inserted into or deleted from each index list defined for that table. Alternatively, when the value of an indexed field is altered for a record in the table, a corresponding record must be altered in the index, which means the database engine must delete the index record from one location in the sorted index list and insert the new record into another location. Since each index list is a sorted structure, often in the form of a tree, these additions or deletions may require a rebalancing of the index structure. Thus, while creating a new index improves the performance of specific queries for which it is designed, it might degrade the performance of other database operations, specifically the performance of insertion, modification and deletion operations. This extra cost may be significant for databases where there are many updates in the records.

In database queries, one problem is how to efficiently determine the position of an index entry within its index. This problem has been addressed with a concept referred to here as "positional awareness." Positional awareness is an index's capability wherein every index entry knows its relative position within the index. This capability is achieved by introducing counters as one of the contents of nodes in the index tree. During a look up operation, positional awareness allows the query engine to quickly determine the position of any index entry within the index.

SUMMARY

The systems and methods described here relate to ways to define and use indexes in a database. These methods can have a number of benefits, including improving insertion rates and reducing query response times.

In one aspect of the present invention, a system and method of creating indexes is based on differentiated subfields. This method provides the ability to automatically enforce index clustering, and thus optimize disk I/O, by differentiating certain types of individual subfields, defined as part of a multi-field database index, into major and minor segments.

In another aspect, a query execution system and method implement a set function calculation algorithm capable of producing group set function results with improved performance, through reducing the number of records and/or index entries read during the execution of a query.

In yet another aspect, systems and methods are used to define inferred indexes for circular tables, utilizing an auto-incremented field of the table. This type of index automatically enforces the position of records and provides a preferred type of index for the circular tables.

The foregoing and other objects, features and advantages of the invention will be apparent from the following more particular description of embodiments, drawings, and claims.

BRIEF DESCRIPTION OF THE DRAWINGS

FIG. 4 illustrates an example of defining differentiated subfields from a field.

FIG. 5 illustrates a set of data in a database table used as an example for defining multi-field indexes.

FIG. 6 illustrates an example of one type of multi-field index and corresponding values.

FIG. 7 illustrates an example of another type of multi-field index and corresponding values.

FIG. 8 illustrates an example of a multi-field index based on differentiated subfields and the corresponding values.

DETAILED DESCRIPTION

The systems and methods described here can be used in the context of a web server system of the type shown in U.S. Pat. No. 6,480,839, incorporated herein by reference, or any other database system. Further the systems and methods can be used in data warehousing, business intelligence applications, and other applications which deal with logging, retrieving or manipulating a large body or a continuous stream of data.

Figure 1:
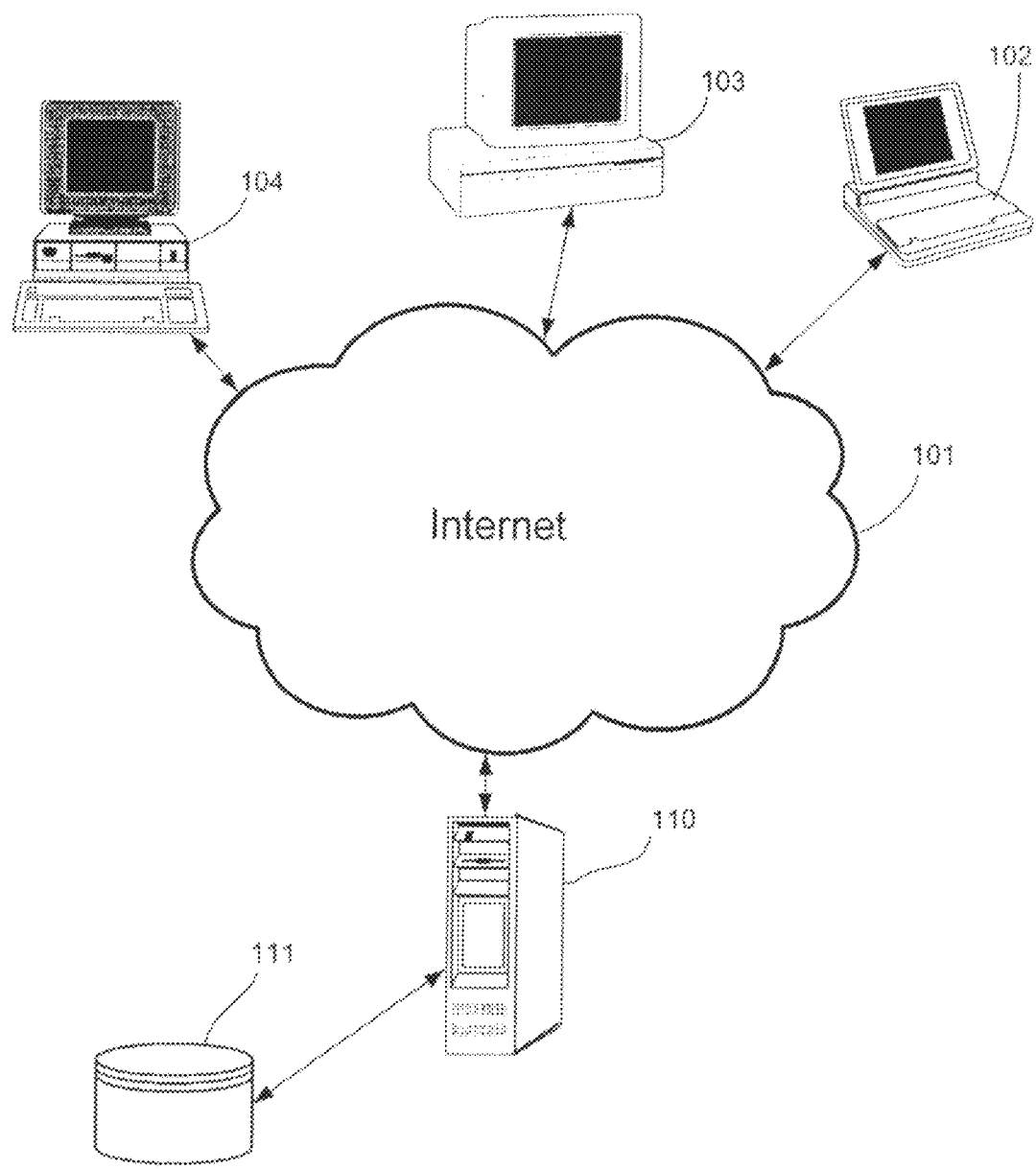
FIG. 1 is a pictorial diagram of an Internet based web server system.

FIG. 1, which is reproduced from the incorporated patent, illustrates an Internet based web server system that includes a web server 110 that accesses data stored on a database storage device 111. Database 111 can be accessed by one or more users using web browsers executing within client computers 102-104 and communicating with web server 110 over Internet 101. In this embodiment, the client computer 103, for example, uses a web browser to communicate using the http communications protocol to send a URL which includes request information across Internet 101 to web server 110. The request information included within the URL typically specifies a database request. The web server 110 processes the URL to obtain the database request information to be supplied to the database 111 resulting in the invocation of the database request specified by the user.

When a database request is complete, web server 110 generates an HTML representation of a web page that has data corresponding to a result set generated when the database request is applied to database 111. This HTML representation of the web page is transmitted back across the Internet 101 to client computer 103 for display to a user using the web browser. This process of sending a database request, generating the results, generating the HTML web page representation of the results, and returning the representation to the user occurs each time a client computer 102-104, communicates over the Internet to web server 110.

Figure 2:
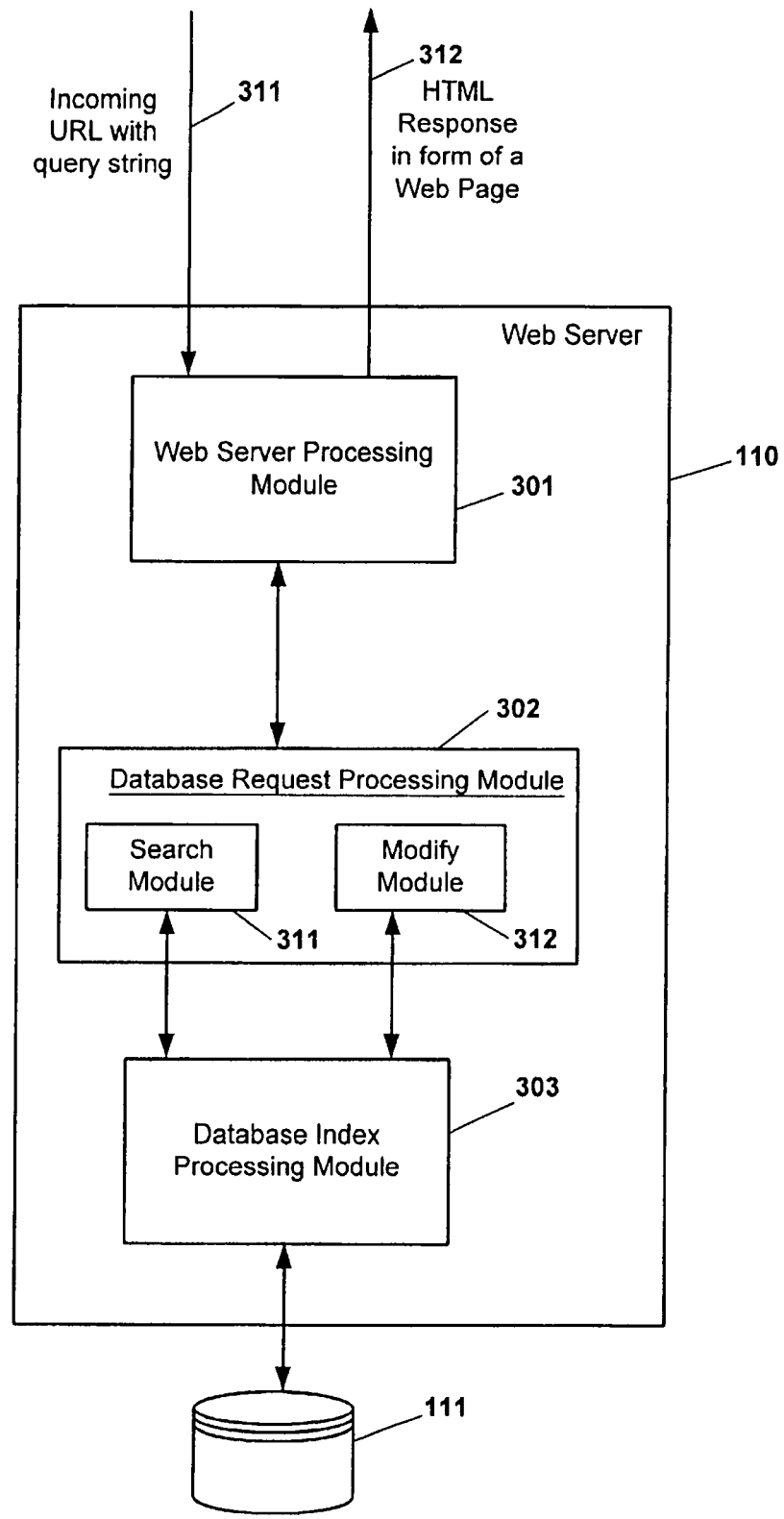
FIG. 2 is a block diagram of a web server computing system including an improved database according to another embodiment of the present invention.

Client computers can have the components illustrated in FIG. 2 of the incorporated U.S. Pat. No. 6,480,839.

FIG. 2 illustrates a web server computing system including a database that can include one or more of the indexing features described below. Web server 110 can include a plurality of processing modules used to receive database requests from users over the Internet 101 and to generate results that are formatted as HTML and transmitted back to a user. These processing modules may include a web server processing module 301, a database request processing module 302, and a database index processing module 303. The web server processing module 301 receives the HTTP request from a user and performs all the necessary HTTP processing needed to generate a database request that is to be applied to database 111. This request is then passed to a database request processing module 302 in which the request is further processed for application against database 111. A part of this processing of the request may include processing within a database index processing module 303. In index processing module 303, portions of the request may be applied to the database using previously generated indexes. The indexes organize and arrange the data within fields and database records in some form of a sequential order. Processing module 303 retrieves and stores various database records within database 111 as necessary.

Each HTTP request received from a user is processed and has an individual separate request used to generate a response. The web server process simultaneously processes the plurality of such database requests, and thus, the web server processing modules 301-303 operating in a multi-threaded environment permits multiple requests of the database to occur simultaneously. These web server processing modules 301-303 handle conflict detection and resolution processing to permit the simultaneous reading of the database while the database may also be modified by a write request.

The Database Request Processing module 302 includes a search module 311 and a modify module 312. The search module 311 performs the processing associated with attempting to locate a request received from a user with data stored within a field in the database. This search module 311 interacts with any B*Tree indices that are used to assist in the searching of the database. Similarly, the modify module 312 processes write requests that alter, add, and delete data stored within database 111. These changes are also reflected within data entries within any related indices that assist in the searching of the database fields.

Figure 3:
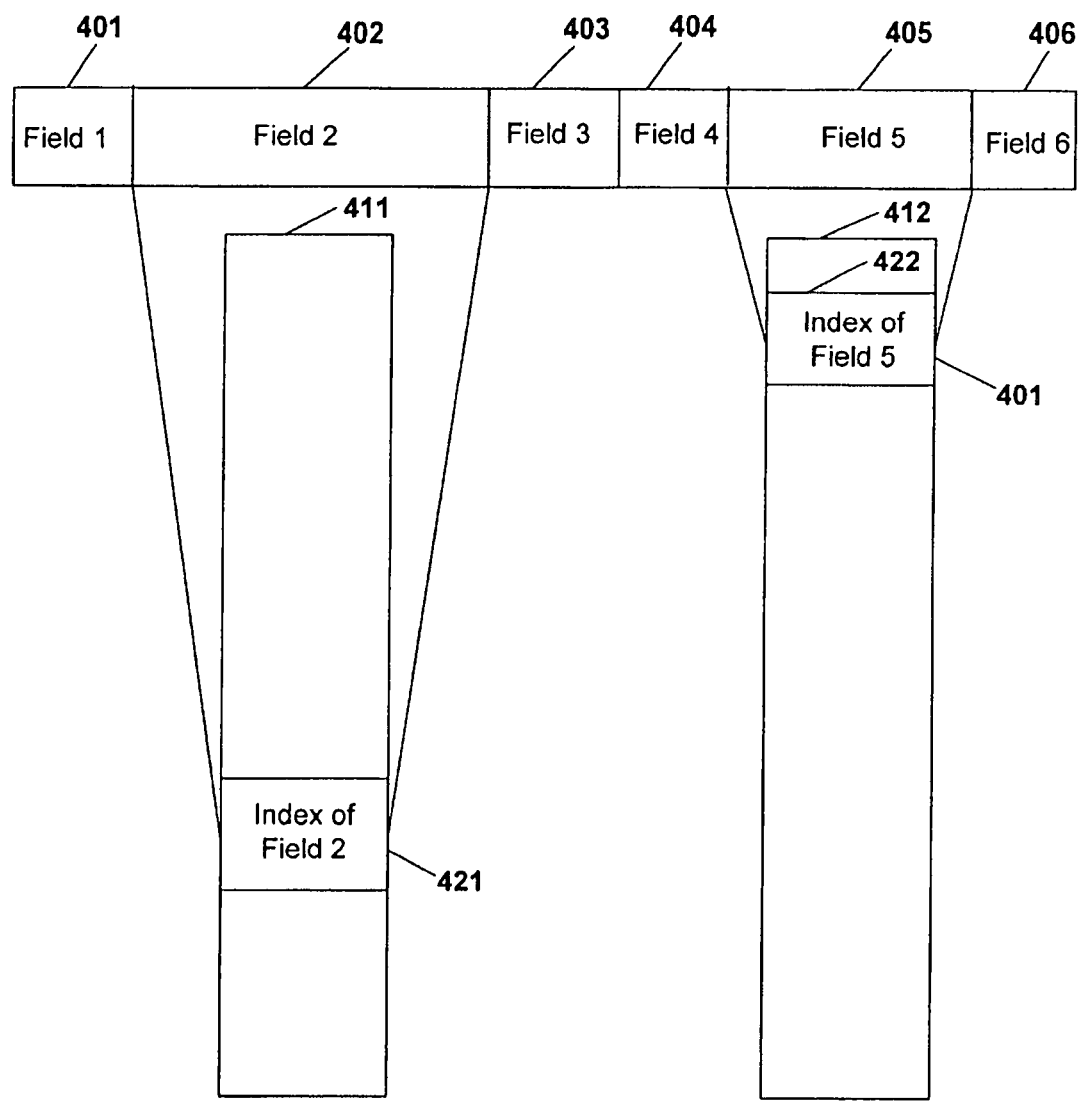
FIG. 3 illustrates a database record included within two indices used in searching the database.

FIG. 3 illustrates a database record included within two indices used in searching the database. Database engines store a specification of a logical structure of a database in a schema. The specific database structure can be specified within the schema using the concepts of Table, Field and Index. The schema specifies that the database has one or more tables. Each table's specification has a name, and a specification of the set of data elements, called fields, that each row stored within the table will contain. Fields are specified by a name, and a definition of the characteristics of the data to be stored within that field, called the field's type (e.g., fixed length text, variable length text, whole numbers, floating point numbers, or large binary data streams). By utilizing the specification of the logical structure defined within a schema a database engine can insure the integrity of the data contained within the database while providing data management services to application programs.

To help the database engine determine the best way to perform search operations associated with the tables within a specific database the schema specifies one or more indexes. An index specifies that one or more fields of a table will be used to search for a row within the table. For each row stored within a table, there may be an index entry associated with that row in each index associated with the table. Additionally, an index's specification tells the database engine whether or not a duplicate entry can be added to the index, thus allowing or disallowing the presence of rows within the table with a duplicate entry for the corresponding field. Indexes that allow duplicates are described as alternate indexes, while those that do not are described as primary indexes.

In FIG. 3, a single row 400 of a database table has a number of fields, Field 1 (401) through Field 6 (406). In addition, two indices, a first index 411 and a second index 412, are shown. First index 411 is based upon Field 2 (402) of the record, and the second index 412 is constructed using Field 5 (405). Because Field 2 and Field 5 contain different data values, the row's location within the respective indices may be different. As with a book, the indexes maintain information relating to where each row is that has a certain value.

The database system can be used in many different types of systems. One example is a system that provides high performance network security, analysis, and protection, such as the NitroSecurity system with NitroGuard intrusion prevention system (IPS); NitroView Receiver for gathering and analyzing security event and network flow data from IPSs, firewalls, and other network and security solutions; and NitroView enterprise security manager (ESM) for integrating and reporting network flow data and security event data. Such a system can be used for a corporate network or a campus-wide network with many users. A security system of this type can require extensive database resources to collect and log security events and network flow data from firewalls, IPSs, and to access such data to analyze and correlate it for network behavior and anomaly analysis. Reports can be generated based upon the significant amounts of collected data.

Additional systems and methods are described for using indexes to improve performance of database operations.

Differentiated Subfields

As is known, indexes can be categorized as clustered or non-clustered indexes. Utilizing clustered indexes is a technique used to enhance the efficiency of index usage. Every table can have at most one clustered index and as many non-clustered indexes as needed. In a clustered index, the data is physically sorted by the clustered index, and in fact they are usually stored in the index nodes. Reaching an index desired by a query accesses the data for the corresponding record at the same time. For non-clustered, or inverted, indexes on the other hand, once the desired index is found, the data in the index node provides a link to the physical location of the desired record. Using a clustered index in a query thus saves a step in reaching the results. Another related concept used in this application is the concept of a "clustering" index. When using an index for a search query, it will be more efficient if the search results are grouped in adjacent or close-by nodes in the index tree. The type of index that shows this convenient property is referred to here as a "clustering" index. Because the indexed search reaches the physical data along with the index, and because, especially in the case of clustering indexes, queries often seek contingent records, the query engine can save on I/O from the disk by caching records that are contingent to those found in each step of the query. Queries that use clustered indexes are thus faster and more efficient in read operations, and therefore defining mechanisms that use clustered indexes for queries can improve database performance.

The concept referred to here as "differentiated subfields" can be used to enforce index clustering, and thus improve disk I/O and search efficiency, by differentiating subfields of a field, defined as part of a clustered multi-field database index, into a major segment and a minor segment, which also represents the most significant part and the least significant part of the field (which is made up of only a most and least significant part without an intermediate part). Major segments naturally partition table entries into subsets with a common value for that segment, such that members of each subset are distinguished by their values for the minor segment. For instance, a "time stamp" field may be divided into a major segment signifying the "year" segment of the field, and a minor segment signifying the rest of the time stamp (from day down to the smallest fraction of time used in the time stamp). As another example, a telephone number field may be divided into a major segment signifying the three leftmost digits, and a minor segment signifying the next seven digits. Thus for a table entry with value of 202-555-1212, the major segment value is 202, and the minor segment value is 5551212. This entry falls into the subset of entries who share the same major segment (202), and is distinguished from other entries in that subset by the value of its minor segment (5551212).

Once a field is differentiated into its major and minor segments, these segments can be used to define a multi-field index by inserting one or more other fields between them. As such, the segments behave like distinct fields in the index. This type of index is different from traditional multi-field indexes in that the division of a field into two or more segments is performed by the database engine and does not require the segments to be actual fields in the table. For instance, in the above example of a time stamp field, the table need not contain any other specific fields representing the year or the other segments of the time.

As an example, the use of differentiated subfields can be especially useful in taking advantage of the characteristics of regularly increasing indexed values such as "time series" data, which would be used, for example, in a system that logs events and the time of those events. The use of differentiated subfields can improve the performance of insertions, deletions, and queries by as much as several orders of magnitude for large data volumes. As an example, in the definition of the contents of a multi-field database index, a timestamp field can be differentiated with a date and time, accurate to the nearest millisecond, into two separate segments. The system automatically constructs and maintains an index with the major segment, representing, for example, the timestamp value accurate to the nearest day at the beginning of the multi-field index, with the remainder of the date and time, or minor segment, containing the hour/minute/second/millisecond portion, at the end of the multi-field index. When the major segment differentiation is defined for the date/time field of the multi-field database index, then a second occurrence of the same date/time field within the same multi-field database index will automatically be understood to be due to a new value for the minor segment.

FIG. 4 shows an example of a timestamp field divided into major and minor segments. The values in the first column (timestamp) are values of the timestamp field for some rows in the table, while the values in the second and third columns correspond to values for major and minor segments corresponding to each row and saved implicitly by the database.

The effect of such differentiated subfields is that index entries are clustered by the major segment values of the differentiated subfield while still retaining the ability to perform rapid queries containing specifications needing the more detailed accuracy of the timestamp field. In practice, a very large table using such differentiated subfields will exhibit higher insertion rates with little or no degradation, even as the population of a table becomes very large, while also providing a high degree of responsiveness to queries.

This capability can be further illustrated with an example. Consider a table named "Parts" including records of parts sold by a company. Assume that the table contains at least two fields, one being a complete time stamp (Dtime) of the sale time and another being an integer number representing the catalog number of the part sold (PartNo) ranging from 1 to 7. FIG. 5 shows an example of a portion of data inserted in this table. The first column (Insertion Order) represents the order by which each row of this section is inserted in the table, which is the same order as Dtime. This column will be used for further analysis, and does not necessarily represent a field in the table. The Dtime and PartNo columns represent the values of corresponding fields in each row. Assume further that the table is often queried for records with specific part categories sold within specific time intervals. In SQL, one example of such a query would be the following:

```
SQL> SELECT   PartNo, Dtime
     FROM     Parts
     WHERE    PartNo > 3
     AND      Dtime >= '01/03/2006 00:02:15.456'
     AND      Dtime <  '01/06/2006 23:12:44.123'
```

To improve the performance of such a query, an index can be created. Below are three alternative options for a multi-field database index, in ascending order of efficiency. The first two options below (Index 1 and Index 2) are multi-field database indexes of the type that are commonly defined for this type of query:

| Index 1 | PartNo + Dtime |
| Index 2 | Dtime + PartNo |

Index 1 is the choice that comes to mind because the order presented in the query seeks PartNo first. It sorts the records first based on PartNo and then based on Dtime. Index 2, on the other hand, sorts the records first based on Dtime and then based on PartNo. The following multi-field database index uses differentiated subfields based on time:

| Index 3 | Dtime1 + PartNo + Dtime2 |

Here, Dtime1 is a major time segment differentiated by day; Dtime2 is the minor time segment with the remainder of the date/time accurate to the nearest millisecond. In other situations or for a different query, the times could be segmented differently, in accordance with the structure of the query and the nature of the data, to achieve optimum efficiency.

FIG. 6 shows the values of index 1 for the data presented in FIG. 5. The rows are sorted by the values of Index 1, which is the order in which they will appear in the index tree in the database. The value of the Insertion Order column for each row is identical to the value of the same column for the corresponding rows in FIG. 5 and represent the relative order in which the row was inserted in the table and thus the order in which the index values are inserted in the index tree. FIGS. 7 and 8 show a similar table for the values of Index 2 and Index 3, respectively. Also in FIGS. 6 to 8, the values that are sought by the above query are marked in bold. As can be inferred from FIGS. 6 and 7, for a table with a very large population, both Index 1 and Index 2 would require the index to inspect large amounts of candidates to find records within the specified time range. This can be seen from the fact that the desired (bold) data are scattered throughout the sorted index. Between the two, Index 1 shows less scatter in the desired data due to small range of values for the first field (PartNo), but this Index would further be characterized by a slow insertion rate because it represents the least clustered option. This deficiency can be inferred from the large rate of fluctuation in the values of Insertion Order which shows that as the table grows, new data are inserted all over the index tree. Index 2, which by definition is sorted by time, shows the highest ordering, but the large amount of scatter in the queried (bold) data causes it to be slow in finding the results of the query. Index 3 takes advantage of time series data clustering, coupled with multiple conditions, allowing a query processing system to inspect a much smaller number of tightly clustered candidate entries, and results in significant reductions in query execution time. These facts can be inferred from the example in FIG. 8, in which the queried (bold) data are grouped together. Moreover the values of Insertion Order in the example of FIG. 8 show that new insertions consistently occur in a portion of the tree located around the end, which increases the efficiency of data insertion when using this index. In practice, the query could be several orders of magnitude faster when using Index 3 compared to Index 1 or Index 2. If the query were requesting a time range on an even day boundary, Index 3 would be even faster, because the query processing system would not interrogate the minor segment of the differentiated subfield at all.

It is generally advisable to design a multi-field database index that uses differentiated subfields so that the minor segment of the differentiated subfield is the last field of the multi-field index. Thus, in Index 3, the minor segment of the date/time field (Dtime2) is at the end following the PartNo field, which in this case would likely be is an integer field with a relatively small finite set of possible values (compared to the possibilities of the minor component of time).

A factor that can affect the performance of the database is the selection of the differentiation level; for example, in the timestamp case, whether to segment the time by year, month, day, hour, or otherwise. An improved, or even optimal, selection depends on the number of entries within the major segment range and upon the selected index cache characteristics (keys per node and nodes in memory). Optimal insertion should occur when the number of entries in a major segment range can be entirely contained in memory. If the major segment were defined to differentiate by day, then the number of entries expected within a day's period of time should be able to be cached within the index nodes in memory. If a large amount of data is expected for each day, then differentiating by hour may yield better results. Queries against such an index become slower as the ratio between the selected time range for the query with respect to the major segment's differentiation unit get larger. For example, a query requesting data for a six month period of time will yield faster results when the major segment of an index represents months, slower when it is measured in days, and still slower when measured in hours.

For large volume database tables, in order to maintain clustering and efficiency, and to reduce the randomness in the values of new entries for a field used in an index, it can be advisable, albeit counter intuitive, to design all table indexes using a differentiated subfield of either a numerically increasing value (i.e., auto-increment field) or a "time series" field (i.e., timestamp). Doing so can improve the efficiency of those indexes, especially during insertion of new entries. For example, an index of just SSN (Social Security Number) could be changed to a differentiated multi-field database index composed of Time0+SSN+Time1.

As suggested above, one application of differentiated subfields, particularly with respect to timestamping, is an electronic or internet system in which there is a constant flow of data corresponding to events, saved along with their time stamps, and frequently queried by specific characteristics of the events as well as the corresponding timestamp. In such systems, efficiency in retrieving data in a reasonable time is highly desirable. In the area of anomaly detection, for example, it can be useful to analyze the propagation of an event by time.

The division of a field into two subfields is one case of more general versions of a differentiated subfield method, where an index can be defined by dividing a field into more than two subfields and inserting other fields of query in between them. In all these cases, the mechanism explained above can be utilized in defining the appropriate subfields, and the appropriate order of the fields inserted among them to provide the best performance based on specific query, the nature of the field, the characteristics of the actual stored data, and characteristics of the query system.

Set Function Calculations

One common type of query in databases is a class referred to as set function calculations. Set functions are powerful and often use features of the relational database query language known as Structured Query Language (SQL). These functions perform a computation on a set of values rather than on a single value. Examples of such functions include COUNT, AVG, SUM, MIN, and MAX (which are self explanatory). Furthermore, SQL can be used to succinctly specify groupings of data, also known as aggregates, and to calculate set functions within each group. In this case, the set functions are commonly called aggregate functions. Since set function calculations are often an explicit or implicit part of operations performed on databases, enhancing the efficiency of their calculation is desirable for improving the overall efficiency of the database. As is the case for many query operations, the proper design of a specific database's indexes, the capabilities of the database engine's indexing system, and the use of database indexes by the database engine's query execution system can all be factors in the speed at which grouped set functions can be calculated.

A typical design goal of a high volume relational database's query execution system is minimizing the amount of disk I/O required to answer a query, because disk I/O is much slower than many other processes (like access to a memory cache). The query execution system discussed here implements a set function calculation algorithm capable of producing group set function aggregation results more quickly by reducing the number of records and/or index entries that must be read during the execution of a query. This set function calculation algorithm takes advantage of index capabilities including positional awareness and differentiated subfields, each described above.

The following example illustrates how the set function calculation algorithm described here can be used. Assume a database has a last name field (lastName) defined for a table ("Names"), and that the field is indexed. Further, assume that an SQL SELECT statement is submitted to the query execution system that requires the calculation of the number of records in the table with a last name field value of "Smith". An example of such a query will look like the following:

```
SQL>   SELECT   COUNT (*)
       FROM     Names
       WHERE    lastName = "Smith";
```

The following steps will be used to calculate the COUNT set function in this example.

1. Find the first index entry where the last name is "Smith".
2. Get the index relative position of the index entry found (e.g., 1000).
3. Find the first index value where the last name is greater than "Smith".
4. Get the index relative position of the index entry found (e.g., 2200).
5. Calculate the difference between the two relative positions (i.e. 1200 in this example).

Using this algorithm, a query execution system can calculate SQL set functions in less time than other algorithms, even orders of magnitude less because individual records need not be read and counted.

By properly defining multi-field database indexes, a query execution system can use this basic algorithm to rapidly produce results for much more complicated queries. For example, an SQL query could specify "GROUP BY SomeField" and find the COUNT of each group in records of a table called SomeTable. A generic SQL query for performing this function could appear as follows:

```
SQL>   SELECT    SomeField, COUNT (*)
       FROM      SomeTable
       GROUP BY  SomeField;
```

In this case, SomeTable could be Names, and SomeField could be lastName, so the query would count how many people have each last name. To improve performance, an index would be specified that begins with SomeField. The query execution system would simply "hop" through the index, repeating the set function calculation algorithm described above for each unique value of SomeField. In so doing, the query execution system will read index entries only, not records, and minimize the number of index entries read. This algorithm results in a reduced number of index reads, no record reads, a reduced number of disk I/O operations, and an improved query execution speed.

A variation on the basic set function calculation algorithm is exemplified by a SQL SELECT statement that specifies the need for the "SUM(SomeNum)" and "GROUP BY SomeField", where SomeNum could be any numerical value present as a field or derived from the fields of the table (e.g. Count). For example, SomeField can again be lastName and SomeNum could be salary, and the result of calculating this function will be a list of all distinct lastNames in the table along with the total salary for each last name group. In this situation, an index is specified that starts with SomeField+SomeNum. The query execution system can "hop" through the index using the basic set function calculation algorithm, but this time for each unique combination of SomeField+SomeNum, it can multiply the SomeNum by the number of index entries and add the result to the SUM for that unique value of SomeField. Once again, the query execution system will read index entries only, not records themselves, and reduce the number of index entries read, resulting in a reduced number of index reads, a reduced number of disk I/O operations, and an improved query execution speed.

By the simple combination of the basic set function calculation algorithm with available primary arithmetic and non-arithmetic functions, the query execution system can calculate SQL SET functions (i.e., MIN, MAX, AVG, etc.) with minimal execution times. Even if records are continually being inserted at high rates during the execution of a query, the fact that the set function calculation algorithm only reads index entries and minimizes those reads insures that query execution will be fast even during high insertion loads.

As another example of the usage of the set function calculation algorithm, consider a slightly more complicated SQL SELECT query that adds WHERE predicates that limit the valid records of interest to a specified time range (e.g., WHERE TimeStamp>=StartTime AND TimeStamp<=EndTime.) An example of such a query written in SQL is:

```
SQL>  SELECT    SomeField, COUNT (*)
      FROM      SomeTable
      WHERE     TimeStamp >= StartTime
      AND       TimeStamp <= EndTime;
      GROUP BY  SomeField;
```

In this case, an index would be specified that uses differentiated subfields, e.g., MajorSegment(TimeStamp)+SomeField+MinorSegment(TimeStamp). The query execution system can hop through the index using the basic set function calculation algorithm, but this time the process hops on MajorSegment(TimeStamp)+SomeField boundaries, automatically benefiting from the clustered nature of the differentiated subfield, and realizes efficiency benefits for such a complex query. In addition to reducing disk I/O as a result of the hopping on MajorSegment(TimeStamp)+SomeField boundaries, the query execution system will read index entries only and reduce the number of index entries read, resulting in reducing the number of index reads, reducing the number of disk I/O operations, and improving the query execution speed.

Another application of this process enables utilizing multi-field indexes that were not originally designed for a specific query and include extraneous field(s) preceding the field(s) of interest. The costs associated with other commonly used SET function processes when there is an extraneous index component, within a multi-field index, that precedes the components of interest to a query are so high that database processing systems will typically disqualify the use of the index.

For example, suppose an index is composed of LastName+FirstName+Sex+Age, and there is the following query:

```
SQL>  SELECT   COUNT (*)
      FROM     SomeTable
      WHERE    FirstName = 'John'
      AND      Age > 21
```

In this example, the combination of unique LastName values, with qualifying FirstName values and unique Sex values, defines the number of times a COUNT SET function algorithm would be applied in order to calculate the count specified by the query.

Typically databases will disqualify such an index because the total cost of using conventional COUNT SET function algorithms this many times is greater than doing a full table scan to get the answer. However, because of the vast improvement in SET function calculation performance provided by the algorithm described above, executing the COUNT SET function this many times is often considerably less costly than a table scan, hence the index is not disqualified and the query is executed, using the index, much faster than calculating the answer with a full table scan.

Circular Table with Inferred Index

An inferred index associated with a circular table can be introduced as a database index composed solely of an auto-increment field. A circular table is a relational database table that has a fixed defined maximum number of records, each with a defined fixed size, that can be contained within the table at any one time. A circular table reuses the oldest record currently stored within the table whenever it needs to make room within the table for another record, and the total number of records ever inserted into the table has exceeded the fixed defined maximum number of records. A circular table can be viewed as a circular cache of records arranged in chronological order of insertion. Circular tables can be used for a variety of applications, including event logging, time series recording, and information gathering. They do not run the risk of overflowing, and do not need regular downtimes to perform archiving of old data, garbage collection, or similar maintenance operations associated with other types of tables used for dynamic applications with constant data input.

Database indexes associated with a circular table are similar to other database indexes except for the case of a database index containing a single automatically incrementing field. If this type of field is defined for such a circular table, it need not be indexed at all. It is referred to as an inferred index, because it is still treated as an index by the system and has all the properties of a normal database index from the point of view of query utilization. It can be the fastest of the indexes associated with its table since it requires no additional insertion time and its use in a query is more desirable than most other index types. This is possible because the system automatically enforces the position of records in a circular table with respect to its auto-increment field if one exists. In other words the auto-increment field is used as a clustered index.

One possible implementation of an inferred index is to keep track of the auto-increment field value of the currently first record stored within the circular table, and to use this value in conjunction with the fact that records are a fixed size to calculate the byte position within the table of the record of interest. For example, suppose one knows that the auto-increment field value of the first record within a circular table is 20, and that the size of each record is 10 bytes. If one wishes to read the record within the circular table whose auto-increment value is 30 the database system would simply calculate the offset of desired record by using the calculation (30-20)*10, which is the difference between auto-increment field values of the desired and the first records times the record size in bytes. Starting at this offset position, the system will then read 10 bytes, the size of one record. Special cases exist for auto-increment field value requests less than the value of the currently first record, greater than the greatest value, and records that have been deleted within the table.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the preferred embodiments have been described as being implemented in software, other embodiments in hardware of firmware implementations may alternatively be used, and vice-versa.

It will be apparent to those of ordinary skill in the art that methods described above can be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

Other aspects, modifications, and embodiments are within the scope of the following claims.

What is claimed is:

1. A method for creating an index for a database table, the database table having at least a first field and a second field, the method comprising the steps of:
    differentiating the first field into a first segment and a second segment, wherein the first segment comprises the most significant part of the first field and the second segment comprises the least significant part of the first field; and
    arranging the two segments in an index for the database table, the index arranged in a sequence beginning with the first segment, followed by the second field, followed by the second segment,
    wherein the first field represents a time value, the first segment represents values of time in a first increment and the second segment represents values of time in a second increment that is smaller than the first increment.

2. The method of claim 1, wherein the differentiating step is performed in response to a query that employs the first field.

3. The method of claim 1, wherein the most significant part is selected to allow the range of data associated with the segment comprising the most significant part to be entirely contained in memory.

4. The method of claim 3, wherein the memory is cache memory.

5. The method of claim 1, wherein the first increment represents days and the second increment represents one or more of hours, seconds or minutes.

6. The method of claim 1, wherein the segment comprising the most significant part represents values of time in days and the segment comprising the least significant part represents values of time in fractions of time that are less than a day.

7. The method of claim 1, wherein the time value is regularly increasing.

8. A system comprising:
    a first memory for storing a database table having a first field and a second field;
    a second memory for storing an index for the database table, the index comprising a sequential arrangement of a first segment of the first field, followed by the second field, followed by a second segment of the first field; and
    wherein, the first segment comprises the most significant part of the first field, and the second segment comprises the least significant part of the first field and wherein the first field represents a time value, the first segment represents values of time in a first increment and the second segment represents values of time in a second increment that is smaller than the first increment.

9. The system of claim 8, wherein the first memory and the second memory reside on the same computer.

10. The system of claim 8, wherein the database table represents data having an insertion order based upon time.

11. The system of claim 8, wherein the database table represents data comprising a plurality of logged events.

12. The system of claim 8, wherein the first increment represents days and the second increment represents one or more of hours, seconds or minutes.

13. The system of claim 8, wherein the first segment represents values of time in days and the second segment represents values of time in fractions of time that are less than a day.

14. The system of claim 8, wherein the first memory and the second memory reside on the same physical memory device.

15. A computer program product embodied on a non-transitory computer readable medium, comprising:
    computer code for storing a database table having a first field and a second field;
    computer code for storing an index for the database table, the index comprising a sequential arrangement of a first segment of the first field, followed by the second field, followed by a second segment of the first field; and
    wherein, the first segment comprises the most significant part of the first field, and the second segment comprises the least significant part of the first field and wherein the first field represents a time value, the first segment represents values of time in a first increment and the second segment represents values of time in a second increment that is smaller than the first increment.

16. The computer program product of claim 15, wherein the database table represents data having an insertion order based upon time.

17. The computer program product of claim 15, wherein the database table represents data comprising a plurality of logged events.

18. The computer program product of claim 15, wherein the first increment represents days and the second increment represents one or more of hours, seconds or minutes.

* * * * *